United States Patent [19]

Matsuoka et al.

[11] 4,379,612
[45] Apr. 12, 1983

[54] SCANNING OPTICAL SYSTEM HAVING A FALL-DOWN CORRECTING FUNCTION

[75] Inventors: Kazuhiko Matsuoka; Kazuo Minoura, both of Yokohama, Japan

[73] Assignee: Canon Kabushiki Kaisha, Tokyo, Japan

[21] Appl. No.: 182,088

[22] Filed: Aug. 28, 1980

[30] Foreign Application Priority Data

Sep. 4, 1979 [JP] Japan .................. 54-113094

[51] Int. Cl.³ ............................................. G02B 27/17
[52] U.S. Cl. ..................... 350/6.8; 350/432; 350/247
[58] Field of Search ............ 346/76 L, 76 PH; 358/199, 128; 350/6.8, 6.91

[56] References Cited

U.S. PATENT DOCUMENTS

| | | | |
|---|---|---|---|
| 3,750,189 | 7/1973 | Fleischer | 350/7 |
| 3,865,465 | 2/1975 | Tatuoka et al. | 350/7 |
| 3,946,150 | 3/1976 | Grafton | 358/6.7 R |
| 4,123,135 | 10/1978 | Rabedeau | 350/6.8 |

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

A scanning optical system provided with a light source portion, a first imaging optical system for linearly imaging the light beam emitted from the light source portion, a deflector having its deflecting-reflecting surface near the linear image formed by said first imaging optical system, a scanned medium scanned by the light beam deflected by the deflector, and a second imaging optical system disposed between the scanned medium and the deflector and comprising, in succession from the deflector side, a spherical single lens and a single lens having a toric surface.

7 Claims, 19 Drawing Figures

SCANNING OPTICAL SYSTEM HAVING A FALL-DOWN CORRECTING FUNCTION

BACKGROUND OF THE INVENTION

1. Field of the Invention

This invention relates to a scanning optical system in which pitch irregularities of scanning lines are eliminated.

2. Description of the Prior Art

Heretofore, various light beam scanning systems using a deflecting-reflecting surface such as rotatable polygon mirror have been proposed in which even if the direction of travel of the light beam deflected and scanned is varied in a plane perpendicular to the deflecting surface by the fall-down of the deflecting-reflecting surface, there occurs no irregularity in the pitch of the scanning lines on a scanned surface (a scanned medium). Herein, the deflecting surface refers to the light beam surface formed with lapse of time by the light beam deflected by the deflecting-reflecting surface of the deflector.

For example, in U.S. Pat. No. 3,750,189, the optical system between the deflector and the scanned medium comprises beam shaping means and second converging means, and the light beam reflected by the deflecting mirror is collimated by the beam shaping means. If the optical system is endowed with such collimating function, the shape of the beam shaping means is restricted, so that the degree of freedom which improves the imaging performance on the scanned surface and the strain characteristic for rendering the scanning speed constant is decreased and necessarily, a good performance cannot be obtained unless the number of lenses forming the second converging means is increased.

In U.S. Pat. No. 3,865,465, a certain predetermined limitation is imposed on the ratio of the focal lengths of two different lenses forming the optical system between the deflector and the scanned medium, and satisfying this limitation is equivalent to collimating the light beam in a cross-section perpendicular to the deflecting surface between the two different lenses. Accordingly, again in this example, the degree of freedom with which the imaging performance and strain characteristic are well corrected is decreased as previously described, and this is not preferable.

In U.S. Pat. No. 3,946,150, a cylindrical lens is disposed between a lens having a strain characteristic for realizing equal speed scanning and the scanned medium. In such a construction, a good image cannot be obtained unless the position of the cylindrical lens is brought close to the scanned medium. If the cylindrical lens comes near the scanned medium, the cylindrical lens becomes longer in the direction of the bus line as the scanning width becomes longer and thus, a compact construction cannot be realized.

U.S. Pat. No. 4,123,135 relates to an optical system for correcting the fall-down of the deflecting-reflecting surface of the deflector, and this system is characterized in that a cylindrical lens having an axis perpendicular to the deflecting surface and having a negative refractive power in the deflecting surface but having no refractive power in a cross-section perpendicular to the deflecting surface is disposed in the imaging optical system between the deflector and the scanned medium. This imaging optical system comprises three lenses.

SUMMARY OF THE INVENTION

It is an object of the present invention to overcome the above-noted disadvantages of the scanning device according to the prior art and to provide a scanning optical system in which fall-down of the deflector can be corrected by a simple and compact construction.

It is a further object of the present invention to provide a scanning optical system in which the beam scanning speed is constant on the scanned surface.

It is still a further object of the present invention to provide a scanning optical system in which the position of the scanning line on the scanned surface can be readily adjusted.

In the scanning optical system according to the present invention, a scanning imaging optical system disposed between the deflector and the scanned medium comprises, in succession from the deflector side, a spherical single lens and a single lens having a toric surface to thereby achieve the above-mentioned objects. That is, the scanning optical system according to the present invention is provided with a light source device, a first imaging optical system for linearly imaging the light beam from the light source device, a deflector having its deflecting-reflecting surface near the linear image, and a second imaging optical system for imaging the linear image as a spot on the scanned medium, the second imaging optical system comprising, in succession from the deflector side, a spherical single lens and a toric single lens. The toric lens herein means a lens having a power in orthogonal directions in a plane orthogonal to the optical axis of the lens, the power differing in said orthogonal directions.

The above-described toric surface according to the present invention has its absolute value of the curvature radius in the deflecting surface greater than its absolute value of the curvature radius in the plane orthogonal to the deflecting surface.

In the scanning optical system according to the present invention, the toric lens is a positive meniscus lens comprising a surface having a negative refractive power on the deflector side and a surface having a positive refractive power on the scanned medium side, in a cross-section containing the optical axis of the spherical single lens and perpendicular to the deflecting surface formed by the beam deflected by the deflector.

In the scanning optical system according to the present invention, the scanning imaging optical system disposed between the deflector and the scanned medium does not have the beam shaping means for once collimating the light beam deflected by the deflector. That is, the system of the present invention does not use the means having a collimating function and therefore, no limitation is imposed on the degree of freedom with which the imaging performance and strain characteristic of the imaging optical system are well corrected. This results in realization of a simple and compact construction.

Further, in the present invention, a toric lens is provided at that side of the spherical single lens which is adjacent to the scanned medium and this, as compared with the case of a cylindrical lens, can correct the strain characteristic and can make the apparatus compact. That is, where a cylindrical lens is used, the refractive power thereof in the deflecting surface is zero and has no degree of freedom with which the curvature of image field is corrected. In contrast, a toric lens has a refractive power in the deflecting surface and can therefore correct the curvature of the image field. Also, if an attempt is made to make the scanning imaging optical system compact by using a cylindrical lens, a great deal of curvature of image field will occur and for the reason set forth above, it will be impossible to correct it by the cylindrical lens itself. In contrast, a toric lens has a degree of freedom for correction and can thus make the scanning imaging optical system compact.

Furthermore, in the present invention, the first imaging optical system is moved in a direction orthogonal to its optical axis and orthogonal to the lengthwise direction of said linear image, thereby effecting the position adjustment of the scanning line on the scanned surface. In the present invention, this first imaging optical system may have a power only in one direction. Accordingly, where this first imaging optical system is moved for the position adjustment of the scanning line, the installation accuracy of the first imaging optical system after being moved may be reduced with respect to the direction in which the first imaging optical system has no power.

The invention will become more fully apparent from the following detailed description thereof taken in conjunction with the accompanying drawings.

DESCRIPTION OF THE PREFERRED EMBODIMENTS

Figure 1:
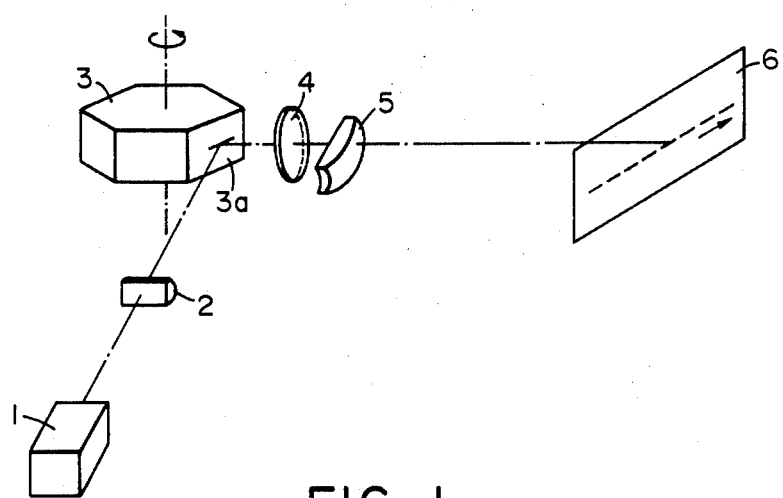
FIG. 1 illustrates the principle of the scanning optical system according to the present invention.

Referring to FIG. 1 which shows the construction according to the principle of the present invention, there are arranged a light source or a light source device 1 comprising a light source and a condenser device, a linear image forming system 2 for forming the light beam emitted from the light source device 1 into a linear image, a deflector 3 having a deflecting-reflecting surface 3a near the position whereat the light beam is linearly converged by the linear image forming system, a spherical single lens 4 between the deflector 3 and a medium 6 to be scanned, and a single lens 5 having a toric surface having a major axis and a minor axis different in refractive power in two orthogonal directions, so that an imaging spot is formed on the scanned medium 6 by the composite system of those lenses and with rotation of the deflector 3, the imaging spot scans over the scanned medium 6. The major axis of the toric surface lies in a plane parallel to the deflecting surface, and the minor axis of the toric surface lies in a plane orthogonal to the deflecting surface and containing the center of curvature of the major axis. The absolute value of the curvature radius with respect to the major axis is greater than the absolute value of the curvature radius with respect to the minor axis.

Figure 2:
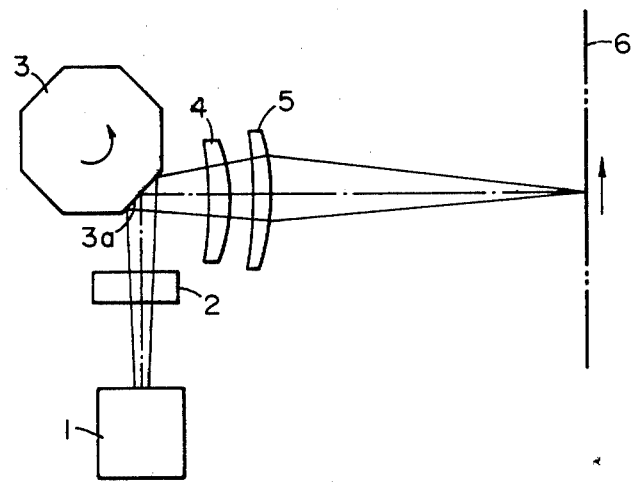
FIG. 2 is a cross-sectional view for illustrating the function of the present invention in a plane parallel to the deflecting surface.

FIG. 2 is a view for illustrating the function in a cross-section parallel to the deflecting surface in the above-described construction, in other words, the plane containing the major axis of the toric lens 5 and the optical axis of the spherical single lens 4. The light beam emitted from the light source device 1 passes through the cylindrical lens 2, whereafter it is reflected by the reflecting surface 3a of the deflector 3 and with rotation of the deflector 3, the reflected light beam is deflected. Further, the deflected light beam is imaged on the scanned medium 6 by the composite system of the spherical single lens 4 and the lens 5 having the toric surface, and the scanning speed of the imaging spot is maintained constant.

Figure 3:
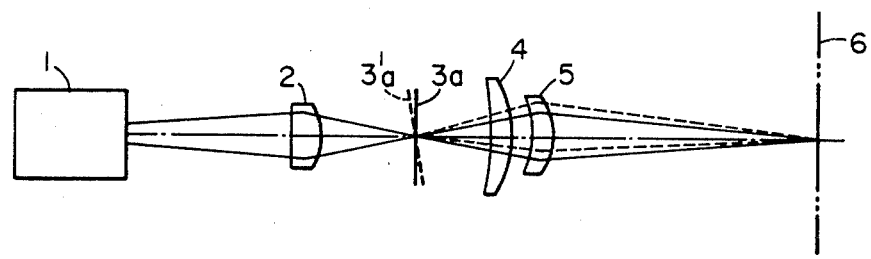
FIG. 3 is a view for illustrating the function of the present invention in a cross-section perpendicular to the deflecting surface.

FIG. 3 is a developed view of the cross-section along the light beam in a direction perpendicular to the above-mentioned deflecting surface, namely, the cross-section for correcting the influence of the fall-down of the deflector. The light beam emitted from the light source device 1 is linearly imaged near the reflecting surface $3a$ of the deflector 3 by the linear image forming system 2. The refractive power of the single lens 5 in this cross-section, unlike the refractive power of the lens 5 in said deflecting surface, renders the positional relation between the reflecting surface $3a$ of the deflector 3 and the scanned medium 6 into an optically conjugate relation by the composite system of the single lens 5 and the spherical single lens 4. Therefore, even if the reflecting surface $3a$ is tilted to a position $3a'$ in a direction perpendicular to the deflecting surface during rotation of the deflector 3, the light beam passing through the lens system 4, 5 changes as indicated by broken lines but there is no change of the imaging position on the scanned medium 6.

Description will now be made of how and why good imaging performance and equal speed scanning are obtained on the scanned medium in the scanning optical system of the present invention in spite of the system being of a simple and compact construction. Where the aperture ratio is as small as 1:30–1:100, two single lenses will be sufficient as the lens construction for providing a good scanning characteristic.

Generally, in a lens system of a small aperture ratio, the aberration coefficients to be corrected are astigmatism coefficient (II) and distortion coefficient (V). These aberration coefficients of the entire lens system have the following relations between characteristic coefficients $a_{III}$, $b_{III}$, $c_{III}$, $a_{V}$, $b_{V}$, $c_{V}$ and inherent coefficients $A$ oi, $B$ oi.

$$\begin{cases} III = \sum_{i=1}^{N} (a_{IIIi} \underline{A} oi + b_{IIIi} \underline{B} oi + c_{IIIi}) \\ V = \sum_{i=1}^{N} (a_{Vi} \underline{A} oi + b_{Vi} \underline{B} oi + c_{Vi}) \end{cases} \quad (1)$$

The characteristic coefficients are constants determined by paraxial relation and medium, and the inherent coefficients $\underline{A}oi$ and $\underline{B}oi$ are coefficients which determine the shape of the ith construction group. Formula (1) above represents the general relation when the number of construction groups is N. (*Lens Designing Method*, by Matsui, Kyoritsu Publishing Co., Ltd.)

Further, where each construction group is a single lens, there is the following secondary relation between the inherent coefficients $\underline{A}oi$ and $\underline{B}oi$ of each single lens:

$$\underline{A}oi = \alpha_i \underline{B}^2 oi + \beta_i \underline{B} oi + \gamma_i \quad (2)$$

where $\alpha$, $\beta_i$ and $\gamma_i$ are constants determined by the refractive index of the medium of the ith single lens.

If equation (2) is substituted for formula (1), $$\begin{cases} III = \sum_{i=1}^{N} (\xi_{IIIi} \underline{B}_{oi}^2 + \eta_{IIIi} \underline{B}_{oi} + \zeta_{IIIi}) \\ V = \sum_{i=1}^{N} (\xi_{Vi} \underline{B}_{oi}^2 + \eta_{Vi} \underline{B}_{oi} + \zeta_{Vi}) \end{cases} \quad (3)$$

where $\xi_{IIIi}$, $\eta_{IIIi}$, $\zeta_{IIIi}$, $\xi_{Vi}$, $\eta_{Vi}$ and $\zeta_{Vi}$ are constants determined by said characteristic coefficients and said constants $\alpha_i$, $\beta_i$ and $\gamma_i$.

If, in formula (3), respective desired aberration coefficient values for obtaining the strain characteristic for providing a good imaging performance and equal speed scanning are set and the number of construction lenses is 2 (N=2), it is possible to solve the simultaneous equations having $\underline{B}_{o1}$ and $\underline{B}_{o2}$ as unknown and to obtain $\underline{B}_{o1}$ and $\underline{B}_{o2}$.

$_{oi}$ is expressed as follows by the curvature radius $R_i$ of the forward surface of the ith lens and the refractive index $N_i$ of the medium of said lens (*Lens Designing Method*, by Matsui);

$$\underline{B}_{oi} = -\frac{N_i}{N_i - 1} + \frac{N_i + 1}{N_i} \left( \frac{1}{R_i} \right) \quad (4)$$

Hence, $$R_i = \left( \frac{N_i + 1}{N_i} \right) / \left( \underline{B}_{oi} + \frac{N_i}{N_i - 1} \right)$$

Thus, from the inherent coefficients $\underline{B}_{o1}$ and $\underline{B}_{o2}$ of the two groups obtained from the aforementioned results, the curvature radii $R_1$ and $R_2$ of the forward surfaces of the respective lenses can be obtained by using equation (4), and the curvature radii $R_1'$ and $R_2'$ of the rearward surfaces of the respective lenses can also be obtained from the following equation.

$$R_i' = (1 - N_i) / \left( 1 - \frac{N_i - 1}{R_i} \right) \quad (5)$$

In the foregoing description, each construction lens is treated as a thin lens having its focal length regularized to 1.

In the actual system of FIG. 2, assuming that the refractive powers of the lenses 4 and 5 are $\phi_1$ and $\phi_2$, respectively, the curvature radii $r_1$, $r_2$, $r_3$ and $r_4$ of the forward and rearward surfaces of the respective lenses are as follows:

$r_1 = R_1/\phi_1$
$r_2 = R_1'/\phi_1$
$r_3 = R_2/\phi_2$
$r_4 = R_2'/\phi_2$

In this manner, by a two single-lens construction, it is possible to determine the shape of each lens which renders into respective desired values the astigmatism coefficient II for providing a good imaging performance and the distortion coefficient V corresponding to the strain characteristic for achieving equal speed scanning.

Next, as regards the direction perpendicular to the deflecting surface, the toric surface is introduced and it is therefore possible to provide a different focal length with respect to the focal length of the composite system of the lenses 4 and 5 in the deflecting surface. Accordingly, it is possible to provide a different imaging relation with respect to the imaging relation in the deflecting surface, and the positions of the reflecting surface 3a of the deflector and the scanned medium 6 are rendered into a conjugate relation.

Further, what is important in the present invention is that at least one surface of the single lens 5 having a toric surface has a negative refractive power in the cross-section perpendicular to the deflecting surface. This is convenient to the correction of the curvature of image field for causing the light beam deflected in the cross-section perpendicular to the deflecting surface to form a good imaging spot on the scanned medium 6. If, in a cross-section parallel to the deflecting surface, the curvature radius $r_3$ of that surface of the single lens 5 having a toric surface which is adjacent to the deflector satisfies $$f_p/r_3 > -2.1$$

with respect to the total focal length $f_p$ of the spherical single lens 4 and the single lens 5 in said cross-section, the aforementioned effect of correcting the curvature of image field will become greater. This condition means that the diverging power for the incident light beam in the cross-section perpendicular to the deflecting surface becomes stronger as the angle of deflection becomes greater, and creates the effect of correcting the image field in the positive direction.

Also, if, in addition to the aforementioned condition $f_T/r_3 > -2.1$, the ratio $f_T/f_T$ between the focal length $f_p$ of the single lens 5 having a toric surface in the cross-section parallel to the deflecting surface and the focal length $f_T$ of said single lens 5 in the cross-section perpendicular to the deflecting surface satisfies $$f_T/p_T < 13.0,$$

it will also become possible to well correct the strain characteristic in the deflecting surface.

Another important thing is that in the cross-section perpendicular to the deflecting surface, the shape of the single lens 5 having the toric surface desirably be that of a meniscus single lens with its surface having a positive refractive power being disposed adjacent to the scanned medium 6 and which has a positive refractive power as a whole. This has the effect of allowing the principal point position of the composite system of the spherical single lens 4 and the single lens 5 having a toric surface to come near the scanned medium in the cross-section perpendicular to the deflecting surface, as a result of which it becomes possible to allow the entire lens system to come near the deflector, thus providing a compact system. If the focal lengths of said composite system in the cross-section parallel to the deflecting surface and in the cross-section perpendicular to the deflecting surface are $f_p$ and $f_v$, respectively, and if $3.0 < f_p/f_v \leq 5.0$ is satisfied, the system will become compact. Especially, if $4.0 \leq f_p/f_v \leq 5.0$ is satisfied, the effect of making the system compact will be great.

In the aforementioned formula (3), the desired value of the astigmatism coefficient II to be corrected is determined by whether the light beam incident on the reflecting surface 3a of the deflector 3 is a divergent light beam, a parallel light beam or a convergent light beam in the deflecting surface. On the other hand, the desired value of the distortion coefficient V to be corrected is determined by the rotation characteristic of the deflector 3.

When the deflector 3 is rotated at an equal angular speed, the value of the distortion coefficient which causes the light beam deflected by the deflector to move on the scanned medium 6 surface at an equal speed is $V = \frac{2}{3}$.

As the deflector 3 is represented by $\phi = \phi_o \sin \omega t$ ($\phi$ being the angle of rotation, $\phi_o$ being the amplitude, $\omega$ being a constant related to the period, t being time), in the case of sine vibration, the value of the distortion coefficient which causes the light beam deflected by the deflector 3 to move at an equal speed on the scanned medium 6 surface is $$V = \frac{2}{3}\left(1 - \frac{1}{8\phi_o^2}\right).$$

Since the present invention has no condition for collimating the light beam between the spherical single lens 4 and the single lens 5 having a toric surface, the degree of freedom of the refractive power of each of said lenses is not limited and a good imaging performance and strain characteristic can be obtained by these two lenses.

Embodiments of the spherical single lens 4 and the single lens 5 having a toric surface in the scanning optical system according to the present invention will be shown below. Tables 1 to 12 show embodiments of the imaging optical system 4, 5 according to the present invention.

Among the Tables, the Tables given a suffix (a) indicate lens data. $r_1-r_4$ are the curvature radii of the lenses in a plane parallel to the deflecting surface, $r_1'-r_4'$ are the curvature radii of the lenses in the cross-section perpendicular to the deflecting surface (accordingly, with regard to the spherical single lens 4, $r_1=r_1'$, $r_2=r_2'$), $d_1$ is the on-axial thickness of the spherical single lens 4, $d_2$ is the on-axial air space between the $r_2$ surface of the spherical single lens 4 and the $r_3$ surface of the single lens 5 having a toric surface (which is equal to the on-axial air space between the $r_2'$ surface of the spherical single lens 4 and the $r_3'$ surface of the single lens 5 having a toric surface), $d_3$ is the on-axial thickness of the single lens 5 having a toric surface, $n_1$ is the refractive index of the spherical single lens 4, and $n_2$ is the refractive index of the single lens 5 having a toric surface.

Those of the Tables which are given a suffix (b) will be described. In a plane parallel to the deflecting surface (hereinafter referred to as the "deflecting plane") and the cross-section perpendicular to the deflecting surface (hereinafter referred to as the "perpendicular cross-section"), the column f shows the focal length of the composite system of the spherical single lens 4 and the single lens 5 having a toric surface. Particularly, for convenience of description, the focal distance in said "deflecting plane" is expressed as $f_p$ and the focal length in the "perpendicular cross-section" is expressed as $f_v$. The column $f_5$ shows the focal length of the single lens 5 having a toric surface. For convenience of description, the focal length in the "deflecting plane" is expressed as $f_T$ and the focal length in the "perpendicular cross-section" is expressed as $f_T'$. The column b.f. shows the back focal length. The column $S_1$ shows the object distance from the first surface (i.e., the $r_1$ or $r_1'$ surface of the spherical single lens). The column $S_k'$ shows the distance from the last surface ($r_4$ or $r_4'$ surface) of the single lens 5 having a toric surface to the Gaussian image plane when the object distance is $S_1$. The column effective F No. shows the image side effective F-number when the object distance is $S_1$.

Those of the Tables which are given a suffix (c) shows the tertiary aberration coefficient when regularized to $f_p=1$ in the plane parallel to the deflecting surface.

Those of the Tables which are given a suffix (d) will be described. The column $\delta$ shows the angle (unit:rad.) formed by the paraxial ray incident on the $r_1'$ surface of the spherical single lens 4 at a height 1 on the principal plane in the cross-section perpendicular to the deflecting surface when regularized to $f_v=1$, with the optical axis, when such ray enters the $r_3'$ surface of the single lens 5 having a toric surface after having left the $r_2'$ surface of the spherical single lens 4. If $\delta \neq 0$, the light beam is not collimated between the $r_2'$ surface of the spherical single lens 4 and the $r_3'$ surface of the lens 5 having a toric surface.

TABLE 1-(a)

| $r_1$ | −65.27560 | $r_1'$ | −65.27560 | $d_1$ | 6.32971 | $n_1$ | 1.59538 |
|---|---|---|---|---|---|---|---|
| $r_2$ | −51.67753 | $r_2'$ | −51.67753 | $d_2$ | 6.32971 | | |
| $r_3$ | 411.88135 | $r_3'$ | −39.11693 | $d_3$ | 6.32971 | $n_2$ | 1.50991 |
| $r_4$ | −86.20866 | $r_4'$ | −12.20747 | | | | |

TABLE 1-(b)

| | | f | | $f_5$ | b.f. | $S_1$ | $S_k'$ | Effective F No. |
|---|---|---|---|---|---|---|---|---|
| Deflecting plane | $f_p$ | 99.99999 | $f_T$ | 140.40724 | 100.12631 | −∞ | 100.12631 | 60.0 |

TABLE 1-(b)-continued

|  |  | f |  | $f_5$ | b.f. | $S_1$ | $S_{k'}$ | Effective F No. |
|---|---|---|---|---|---|---|---|---|
| Perpendicular cross-section | $f_V$ | 29.48940 | $f_T$ | 32.23998 | 31.32358 | −26.79579 | 99.60350 | 100.0 |

TABLE 1 - (c)

| I | II | III | P | V |
|---|---|---|---|---|
| 6.46817 | −0.28460 | −0.16495 | 0.62416 | 0.61867 |

TABLE 1 - (d)

| $\delta$ | $\epsilon_{max}$ | $r_4/r_3$ | $f_p/r_3$ | $f_T/f_T$ | $f_p/f_v$ |
|---|---|---|---|---|---|
| −0.61374 | 29.15465 | −0.20931 | 0.24279 | 4.35507 | 3.39105 |

TABLE 2 - (a)

| $r_1$ | −63.25409 | $r'_1$ | −63.25409 | $d_1$ | 6.36775 | $n_1$ | 1.70269 |
| $r_2$ | −52.72465 | $r'_2$ | −52.72456 | $d_2$ | 6.36775 |  |  |
| $r_3$ | 415.41869 | $r'_3$ | −39.60989 | $d_3$ | 6.36775 | $n_2$ | 1.50991 |
| $r_4$ | −85.98748 | $r'_4$ | −12.30169 |  |  |  |  |

TABLE 2 - (b)

|  |  | f |  | $f_5$ | b.f. | $S_1$ | $S_{k'}$ | Effective F No. |
|---|---|---|---|---|---|---|---|---|
| Deflecting plane | $f_p$ | 100.00001 | $f_T$ | 140.31518 | 100.69012 | −∞ | 100.69102 | 60.0 |
| Perpendicular cross-section | $f_v$ | 29.54067 | $f_T$ | 32.43860 | 31.54320 | −26.95680 | 100.19817 | 100.0 |

TABLE 2 - (c)

| I | II | III | P | V |
|---|---|---|---|---|
| 6.43969 | −0.27146 | −0.16089 | 0.60433 | 0.62013 |

TABLE 2 - (d)

| $\delta$ | $\epsilon_{max}$ | $r_4/r_3$ | $f_p/r_3$ | $f_T/f_T$ | $f_p/f_v$ |
|---|---|---|---|---|---|
| −0.61207 | 29.04269 | −0.20699 | 0.24072 | 4.32556 | 3.38516 |

TABLE 3 - (a)

| $r_1$ | −65.40452 | $r'_1$ | −65.40452 | $d_1$ | 6.31236 | $n_1$ | 1.59583 |
| $r_2$ | −51.14359 | $r'_2$ | −51.14359 | $d_2$ | 6.31236 |  |  |
| $r_3$ | 362.55977 | $r'_3$ | −38.80420 | $d_3$ | 6.31236 | $n_2$ | 1.48330 |
| $r_4$ | −84.90856 | $r'_4$ | −11.70740 |  |  |  |  |

TABLE 3 - (b)

|  |  | f |  | $f_5$ | b.f. | $S_1$ | $S_{k'}$ | Effective F No. |
|---|---|---|---|---|---|---|---|---|
| Deflecting plane | $f_p$ | 100.0 | $f_T$ | 143.00551 | 99.89905 | −∞ | 99.89905 | 60.0 |
| Perpendicular cross-section | $f_v$ | 29.41967 | $f_T$ | 32.24268 | 31.14615 | −26.72231 | 99.33635 | 100.0 |

TABLE 3 - (c)

| I | II | III | P | V |
|---|---|---|---|---|
| 6.61678 | −0.27837 | −0.16698 | 0.63271 | 0.61596 |

TABLE 3 - (d)

| $\delta$ | $\epsilon_{max}$ | $r_4/r_3$ | $f_p/r_3$ | $f_T/f_T$ | $f_p/f_v$ |
|---|---|---|---|---|---|
| −0.61121 | 29.42713 | −0.23419 | 0.27582 | 4.43529 | 3.39909 |

TABLE 4 - (a)

| $r_1$ | −58.82450 | $r'_1$ | −58.82450 | $d_1$ | 6.42988 | $n_1$ | 1.50991 |
| $r_2$ | −50.19578 | $r'_2$ | −50.19578 | $d_2$ | 6.42988 |  |  |
| $r_3$ | 1690.12801 | $r'_3$ | −42.23338 | $d_3$ | 6.42988 | $n_2$ | 1.70269 |
| $r_4$ | −92.63733 | $r'_4$ | −15.66758 |  |  |  |  |

TABLE 4 - (b)

|  |  | f |  | $f_5$ | b.f. | $S_1$ | $S_{k'}$ | Effective F No. |
|---|---|---|---|---|---|---|---|---|
| Deflecting plane | $f_p$ | 100.00001 | $f_T$ | 125.16837 | 101.62692 | −∞ | 101.62692 | 60.0 |
| Perpendicular cross-section | $f_v$ | 29.98307 | $f_T$ | 32.22724 | 32.44994 | −27.21982 | 100.19260 | 100.0 |

TABLE 4 - (c)

| I | II | III | P | V |
|---|---|---|---|---|
| 5.99630 | −0.22613 | −0.15095 | 0.56860 | 0.62777 |

TABLE 4 - (d)

| $\delta$ | $\epsilon_{max}$ | $r_4/r_3$ | $f_p/r_3$ | $f_T/f_T$ | $f_p/f_v$ |
|---|---|---|---|---|---|
| −0.63083 | 27.80320 | −0.05481 | 0.05917 | 3.88393 | 3.33522 |

TABLE 5 - (a)

| $r_1$ | −104.13724 | $r'_1$ | −104.13724 | $d_1$ | 6.25173 | $n_1$ | 1.59533 |
| $r_2$ | −69.15419 | $r'_2$ | −69.15419 | $d_2$ | 6.25173 |  |  |
| $r_3$ | ∞ | $r'_3$ | −34.51051 | $d_3$ | 6.25173 | $n_2$ | 1.50991 |
| $r_4$ | −73.02843 | $r'_4$ | −11.65612 |  |  |  |  |

TABLE 5 - (b)

|  |  | f |  | $f_5$ | b.f. | $S_1$ | $S_k'$ | Effective F No. |
|---|---|---|---|---|---|---|---|---|
| Deflecting plane | $f_p$ | 100.0 | $f_T$ | 143.21827 | 99.03431 | $-\infty$ | 99.03431 | 60.0 |
| Perpendicular cross-section | $f_v$ | 29.17851 | $f_{T'}$ | 31.59868 | 30.68737 | $-26.46566$ | 98.39212 | 100.0 |

TABLE 5 - (c)

| I | II | III | P | V |
|---|---|---|---|---|
| 6.27056 | $-0.32612$ | $-0.15447$ | 0.64372 | 0.59729 |

TABLE 5 - (d)

| $\delta$ | $\epsilon_{max}$ | $r_4/r_3$ | $f_p/r_3$ | $f_T/f_{T'}$ | $f_p/f_v$ |
|---|---|---|---|---|---|
| $-0.61819$ | 26.02809 | 0.0 | 0.0 | 4.53241 | 3.42718 |

TABLE 6 - (a)

| $r_1$ | $-96.03189$ | $r'_1$ | $-96.03189$ | $d_1$ | 6.28837 | $n_1$ | 1.70269 |
|---|---|---|---|---|---|---|---|
| $r_2$ | $-70.08476$ | $r'_2$ | $-70.08476$ | $d_2$ | 6.28837 |  |  |
| $r_3$ | $\infty$ | $r'_3$ | $-35.28283$ | $d_3$ | 6.28837 | $n_2$ | 1.50991 |
| $r_4$ | $-72.33688$ | $r'_4$ | $-11.76020$ |  |  |  |  |

TABLE 6 - (b)

|  |  | f |  | $f_5$ | b.f. | $S_1$ | $S_k'$ | Effective F No. |
|---|---|---|---|---|---|---|---|---|
| Deflecting plane | $f_p$ | 100.0 | $f_T$ | 141.86205 | 99.58740 | $-\infty$ | 99.58740 | 60.0 |
| Perpendicular cross-section | $f_v$ | 29.22304 | $f_{T'}$ | 31.72929 | 30.87595 | $-26.62078$ | 98.97599 | 100.0 |

TABLE 6 - (c)

| I | II | III | P | V |
|---|---|---|---|---|
| 6.35924 | $-0.29366$ | $-0.15210$ | 0.62596 | 0.59719 |

TABLE 6 - (d)

| $\delta$ | $\epsilon_{max}$ | $r_4/r_3$ | $f_p/r_3$ | $f_t/f_t'$ | $f_p/f_v$ |
|---|---|---|---|---|---|
| $-0.61831$ | 26.01836 | 0.0 | 0.0 | 4.47101 | 3.42196 |

TABLE 7 - (a)

| $r_1$ | $-113.67176$ | $r'_1$ | $-113.67176$ | $d_1$ | 6.21517 | $n_1$ | 1.59538 |
|---|---|---|---|---|---|---|---|
| $r_2$ | $-70.31723$ | $r'_2$ | $-70.31723$ | $d_2$ | 6.21517 |  |  |
| $r_3$ | $\infty$ | $r'_3$ | $-32.66198$ | $d_3$ | 6.21517 | $n_2$ | 1.48330 |
| $r_4$ | $-72.15232$ | $r'_4$ | $-11.04071$ |  |  |  |  |

TABLE 7 - (b)

|  |  | f |  | $f_5$ | b.f. | $S_1$ | $S_k'$ | Effective F No. |
|---|---|---|---|---|---|---|---|---|
| Deflecting plane | $f_p$ | 100.0 | $f_T$ | 149.29096 | 98.50049 | $-\infty$ | 98.50049 | 60.0 |
| Perpendicular cross-section | $f_v$ | 29.03092 | $f_{T'}$ | 31.55431 | 30.39421 | $-26.31088$ | 97.81531 | 100.0 |

TABLE 7 - (c)

| I | II | III | P | V |
|---|---|---|---|---|
| 6.26524 | $-0.35871$ | $-0.15356$ | 0.65400 | 0.59321 |

TABLE 7 - (d)

| $\delta$ | $\epsilon_{max}$ | $r_4/r_3$ | $f_p/r_3$ | $f_T/f_{T'}$ | $f_p/f_v$ |
|---|---|---|---|---|---|
| $-0.61339$ | 25.75282 | 0.0 | 0.0 | 4.73124 | 3.44460 |

TABLE 8 - (a)

| $r_1$ | $-63.26744$ | $r'_1$ | $-63.26744$ | $d_1$ | 6.43143 | $n_1$ | 1.50991 |
|---|---|---|---|---|---|---|---|
| $r_2$ | $-53.99132$ | $r'_2$ | $-53.99132$ | $d_2$ | 6.43143 |  |  |
| $r_3$ | $\infty$ | $r'_3$ | $-42.55582$ | $d_3$ | 6.43143 | $n_2$ | 1.70269 |
| $r_4$ | $-86.18348$ | $r'_4$ | $-15.64993$ |  |  |  |  |

TABLE 8 - (b)

|  |  | f |  | $f_5$ | b.f. | $S_1$ | $S_k'$ | Effective F No. |
|---|---|---|---|---|---|---|---|---|
| Deflecting plane | $f_p$ | 100.0 | $f_T$ | 122.64794 | 101.68839 | $-\infty$ | 101.68839 | 60.0 |
| Perpendicular cross-section | $f_v$ | 29.99780 | $f_{T'}$ | 32.06282 | 32.41892 | $-27.22637$ | 101.22387 | 100.0 |

TABLE 8 - (c)

| I | II | III | P | V |
|---|---|---|---|---|
| 0.02252 | $-0.20250$ | $-0.14970$ | 0.57056 | 0.62285 |

TABLE 8 - (d)

| $\delta$ | $\epsilon_{max}$ | $r_4/r_3$ | $f_p/r_3$ | $f_T/f_{T'}$ | $f_p/f_v$ |
|---|---|---|---|---|---|
| $-0.63597$ | 27.22567 | 0.0 | 0.0 | 3.82524 | 3.33358 |

TABLE 9 - (a)

| $r_1$ | $-61.21937$ | $r'_1$ | $-61.21937$ | $d_1$ | 7.49377 | $n_1$ | 1.58611 |
|---|---|---|---|---|---|---|---|
| $r_2$ | $-55.26615$ | $r'_2$ | $-55.26615$ | $d_2$ | 7.49081 |  |  |
| $r_3$ | 2387.19485 | $r'_3$ | $-31.67413$ | $d_3$ | 7.49078 | $n_2$ | 1.53785 |
| $r_4$ | $-66.80165$ | $r'_4$ | $-11.13852$ |  |  |  |  |

TABLE 9 - (b)

|  |  | f |  | $f_5$ | b.f. | $S_1$ | $S_{K'}$ | Effective F No. |
|---|---|---|---|---|---|---|---|---|
| Deflecting plane | $f_p$ | 99.99935 | $f_T$ | 120.94943 | 102.54132 | $-\infty$ | 102.54132 | 60.0 |
| Perpendicular cross-section | $f_v$ | 26.55801 | $f_T$ | 28.32813 | 29.53442 | $-18.03525$ | 101.20096 | 100.0 |

TABLE 9 - (c)

| I | II | III | P | V |
|---|---|---|---|---|
| 7.40537 | $-0.38428$ | $-0.11085$ | 0.60322 | 0.60354 |

TABLE 9 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.67218$ | 27.76585 | $-0.02798$ | 0.04189 | 4.26959 | 3.76532 |

TABLE 10 - (a)

| $r_1$ | $-49.46519$ | $r'_1$ | $-49.46519$ | $d_1$ | 7.90475 | $n_1$ | 1.79136 |
|---|---|---|---|---|---|---|---|
| $r_2$ | $-53.94124$ | $r'_2$ | $-53.94124$ | $d_2$ | 7.90470 |  |  |
| $r_3$ | $-611.60256$ | $r'_3$ | $-35.89765$ | $d_3$ | 7.90469 | $n_2$ | 1.55363 |
| $r_4$ | $-53.05425$ | $r'_4$ | $-11.55629$ |  |  |  |  |

TABLE 10 - (b)

|  |  | f |  | $f_5$ | b.f. | $S_1$ | $S_{K'}$ | Effective F No. |
|---|---|---|---|---|---|---|---|---|
| Deflecting plane | $f_p$ | 100.00070 | $f_T$ | 104.40576 | 107.93367 | $-\infty$ | 107.93367 | 60.0 |
| Perpendicular cross-section | $f_v$ | 25.86281 | $f_T$ | 27.59081 | 29.96403 | $-15.93758$ | 106.74816 | 100.0 |

TABLE 10 - (c)

| I | II | III | P | V |
|---|---|---|---|---|
| 10.34164 | 0.23778 | $-0.10066$ | 0.53930 | 0.59026 |

TABLE 10 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.70309$ | 26.35079 | 0.08675 | $-0.16351$ | 3.78408 | 3.86658 |

TABLE 11 - (a)

| $r_1$ | $-48.90612$ | $r'_1$ | $-48.90612$ | $d_1$ | 7.90433 | $n_1$ | 1.79927 |
|---|---|---|---|---|---|---|---|
| $r_2$ | $-53.91277$ | $r'_2$ | $-53.91277$ | $d_2$ | 7.90432 |  |  |
| $r_3$ | $-863.58893$ | $r'_3$ | $-35.97083$ | $3_3$ | 7.90431 | $n_2$ | 1.55419 |
| $r_4$ | $-53.77089$ | $r'_4$ | $-11.54920$ |  |  |  |  |

TABLE 11 - (b)

|  |  | f |  | $f_5$ | b.f. | $S_1$ | $S_{K'}$ | Effective F No. |
|---|---|---|---|---|---|---|---|---|
| Deflecting plane | $f_p$ | 100.00078 | $f_T$ | 103.10964 | 108.12026 | $-\infty$ | 108.12026 | 60.0 |
| Perpendicular cross-section | $f_v$ | 25.81655 | $f_T$ | 27.51911 | 29.99749 | $-15.88357$ | 106.67594 | 100.0 |

TABLE 11 - (c)

| I | II | III | P | V |
|---|---|---|---|---|
| 10.01258 | 0.22663 | $-0.08551$ | 0.53751 | 0.60134 |

TABLE 11 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.70478$ | 26.91509 | 0.06226 | $-0.11597$ | 3.74684 | 3.87351 |

TABLE 12 - (a)

| $r_1$ | $-293.24044$ | $r'_1$ | $-293.24044$ | $d_1$ | 5.88268 | $n_1$ | 1.59538 |
|---|---|---|---|---|---|---|---|
| $r_2$ | $-59.23652$ | $r'_2$ | $-59.23652$ | $d_2$ | 5.88268 |  |  |
| $r_3$ | $-49.02234$ | $r'_3$ | $-10.76293$ | $d_3$ | 5.88268 | $n_2$ | 1.50991 |
| $r_4$ | $-41.48573$ | $r'_4$ | $-7.72696$ |  |  |  |  |

TABLE 12 - (b)

|  |  | f |  | $f_5$ | b.f. | $S_1$ | $S_{K'}$ | Effective F No. |
|---|---|---|---|---|---|---|---|---|
| Deflecting plane | $f_p$ | 100.0 | $f_T$ | 418.80742 | 96.72185 | $-\infty$ | 96.72185 | 60.0 |
| Perpendicular cross-section | $f_v$ | 28.11088 | $f_T$ | 32.47258 | 31.07636 | $-24.90334$ | 92.38294 | 100.0 |

TABLE 12 - (c)

| I | II | III | P | V |
|---|---|---|---|---|
| 10.70009 | 0.50945 | 0.06621 | 0.62788 | 0.53405 |

TABLE 12 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.52198$ | 0.97507 | 0.84626 | $-2.03989$ | 12.89726 | 3.55734 |

TABLE 13 - (a)

| $r_1$ | $-25.067$ | $r'_1$ | $-25.067$ | $d_1$ | 6.329 | $n_1$ | 1.78322 |
|---|---|---|---|---|---|---|---|
| $r_2$ | $-30.314$ | $r'_2$ | $-30.314$ | $d_2$ | 18.165 |  |  |
| $r_3$ | $\infty$ | $r'_3$ | $-47.987$ | $d_3$ | 5.414 | $n_2$ | 1.50991 |
| $r_4$ | $-47.411$ | $r'_4$ | $-10.737$ |  |  |  |  |

TABLE 13 - (b)

|  | f |  | f₅ | b.f. | S₁ | S'₁ | Effective F No. |
|---|---|---|---|---|---|---|---|
| Deflecting plane | $f_p$ | 100.0 | $f_T$ 92.979 | 116.620 | $-\infty$ | 116.620 | 60.0 |
| Perpendicular cross-section | $f_v$ | 23.452 | $f_T$ 25.857 | 28.384 | $-5.681$ | 117.222 | 100.0 |

TABLE 13 - (c)

| I | II | III | P | V |
|---|---|---|---|---|
| 9.300 | 1.558 | $-0.157$ | 0.409 | 0.666 |

TABLE 13 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.730$ | 26.231 | 0.0 | 0.0 | 3.596 | 4.264 |

TABLE 14 - (a)

| $r_1$ | $-25.076$ | $r'_1$ | $-25.076$ | $d_1$ | 6.331 | $n_1$ | 1.78322 |
| $r_2$ | $-30.325$ | $r'_2$ | $-30.325$ | $d_2$ | 18.172 | | |
| $r_3$ | $\infty$ | $r'_3$ | $-48.151$ | $d_3$ | 5.416 | $n_2$ | 1.48330 |
| $r_4$ | $-44.945$ | $r'_4$ | $-10.292$ | | | | |

TABLE 14 - (b)

|  | f |  | f₅ | b.f. | S₁ | S'₁ | Effective F No. |
|---|---|---|---|---|---|---|---|
| Deflecting plane | $f_p$ | 100.0 | $f_T$ 92.997 | 116.635 | $-\infty$ | 116.635 | 60.0 |
| Perpendicular cross-section | $f_v$ | 23.472 | $f_T$ 25.880 | 28.372 | $-5.750$ | 116.164 | 100.0 |

TABLE 14 - (c)

| I | II | III | P | V |
|---|---|---|---|---|
| 10.606 | 1.742 | $-0.154$ | 0.422 | 0.659 |

TABLE 14 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.728$ | 26.238 | 0.0 | 0.0 | 3.593 | 4.260 |

TABLE 15 - (a)

| $r_1$ | $-25.067$ | $r'_1$ | $-25.067$ | $d_1$ | 6.329 | $n_1$ | 1.78322 |
| $r_2$ | $-30.314$ | $r'_2$ | $-30.314$ | $d_2$ | 18.165 | | |
| $r_3$ | $\infty$ | $r'_3$ | $-43.024$ | $d_3$ | 5.414 | $n_2$ | 1.60770 |
| $r_4$ | $-56.476$ | $r'_4$ | $-12.050$ | | | | |

TABLE 15 - (b)

|  | f |  | f₅ | b.f. | S₁ | S'₁ | Effective F No. |
|---|---|---|---|---|---|---|---|
| Deflecting plane | $f_p$ | 100.0 | $f_T$ 92.935 | 116.565 | $-\infty$ | 116.565 | 60.0 |
| Perpendicular cross-section | $f_v$ | 23.434 | $f_T$ 25.837 | 28.605 | $-5.681$ | 117.248 | 100.0 |

TABLE 15 - (c)

| I | II | III | P | V |
|---|---|---|---|---|
| 5.804 | 1.125 | $-0.138$ | 0.366 | 0.690 |

TABLE 15 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.730$ | 26.231 | 0.0 | 0.0 | 3.597 | 4.267 |

TABLE 16 - (a)

| $r_1$ | $-20.102$ | $r'_1$ | $-20.102$ | $d_1$ | 5.359 | $n_1$ | 1.70916 |
| $r_2$ | $-24.047$ | $r'_2$ | $-24.047$ | $d_2$ | 14.877 | | |
| $r_3$ | $\infty$ | $r'_3$ | $-30.798$ | $d_3$ | 4.697 | $n_2$ | 1.63398 |
| $r_4$ | $-58.485$ | $r'_4$ | $-10.614$ | | | | |

TABLE 16 - (b)

|  | f |  | f₅ | b.f. | S₁ | S'₁ | Effective F No. |
|---|---|---|---|---|---|---|---|
| Deflecting plane | $f_p$ | 100.0 | $f_T$ 92.251 | 115.545 | $-\infty$ | 115.545 | 60.0 |
| Perpendicular cross-section | $f_v$ | 21.316 | $f_T$ 23.431 | 26.079 | $-5.955$ | 115.742 | 100.0 |

TABLE 16 - (c)

| I | II | III | P | V |
|---|---|---|---|---|
| 1.546 | 1.150 | $-0.113$ | 0.325 | 0.657 |

TABLE 16 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.745$ | 26.266 | 0.0 | 0.0 | 3.937 | 4.691 |

TABLE 17 - (a)

| $r_1$ | $-23.585$ | $r'_1$ | $-23.585$ | $d_1$ | 5.424 | $n_1$ | 1.78322 |
| $r_2$ | $-27.489$ | $r'_2$ | $-27.489$ | $d_2$ | 15.017 | | |
| $r_3$ | $\infty$ | $r'_3$ | $-26.395$ | $d_3$ | 4.375 | $n_2$ | 1.63398 |
| $r_4$ | $-60.705$ | $r'_4$ | $-10.024$ | | | | |

TABLE 17 - (b)

| | | f | | $f_S$ | b.f. | $S_1$ | $S'_1$ | Effective F No. |
|---|---|---|---|---|---|---|---|---|
| Deflecting plane | $f_p$ | 100.0 | $f_T$ | 95.752 | 113.356 | $-\infty$ | 113.356 | 60.0 |
| Perpendicular cross-section | $f_v$ | 21.126 | $F_T$ | 23.098 | 25.481 | $-5.765$ | 113.624 | 100.0 |

TABLE 17 - (c)

| I | II | III | P | V |
|---|---|---|---|---|
| 5.026 | 0.456 | $-0.099$ | 0.375 | 0.646 |

TABLE 17 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.745$ | 26.272 | 0.0 | 0.0 | 4.145 | 4.734 |

TABLE 18 - (a)

| $r_1$ | $-20.009$ | $r'_1$ | $-20.009$ | $d_1$ | 5.403 | $n_1$ | 1.70780 |
| $r_2$ | $-24.039$ | $r'_2$ | $-24.039$ | $d_2$ | 14.958 | | |
| $r_3$ | $\infty$ | $r'_3$ | $-30.842$ | $d_3$ | 4.358 | $n_2$ | 1.63398 |
| $r_4$ | $-58.121$ | $r'_4$ | $-10.513$ | | | | |

TABLE 18 - (b)

| | | f | | $f_S$ | b.f. | $S_1$ | $S'_1$ | Effective F No. |
|---|---|---|---|---|---|---|---|---|
| Deflecting plane | $f_p$ | 100.0 | $f_T$ | 91.677 | 115.836 | $-\infty$ | 115.836 | 60.0 |
| Perpendicular cross-section | $f_v$ | 21.116 | $f_T$ | 23.227 | 25.793 | $-5.743$ | 117.134 | 100.0 |

TABLE 18 - (c)

| I | II | III | P | V |
|---|---|---|---|---|
| 1.204 | 1.203 | $-0.115$ | 0.320 | 0.658 |

TABLE 18 - (d)

| $\delta$ | $\epsilon_{max}$ | $r_4/r_3$ | $f_p/r_3$ | $f_T/f_T$ | $f_p/f_v$ |
|---|---|---|---|---|---|
| $-0.749$ | 26.243 | 0.0 | 0.0 | 3.947 | 4.736 |

TABLE 19 - (a)

| $r_1$ | $-22.097$ | $r'_1$ | $-22.097$ | $d_1$ | 5.401 | $n_1$ | 1.73682 |
| $r_2$ | $-26.738$ | $r'_2$ | $-26.738$ | $d_2$ | 14.953 | | |
| $r_3$ | $\infty$ | $r'_3$ | $-29.941$ | $d_3$ | 5.391 | $n_2$ | 1.60770 |
| $r_4$ | $-54.394$ | $r'_4$ | $-10.134$ | | | | |

TABLE 19 - (b)

| | | f | | $f_S$ | b.f. | $S_1$ | $S'_1$ | Effective F No. |
|---|---|---|---|---|---|---|---|---|
| Deflecting plane | $f_p$ | 100.0 | $f_T$ | 89.507 | 115.733 | $-\infty$ | 115.733 | 60.0 |
| Perpendicular cross-section | $f_v$ | 20.894 | $f_T$ | 22.858 | 25.813 | $-4.706$ | 117.080 | 100.0 |

TABLE 19-(c)

| I | II | III | P | V |
|---|---|---|---|---|
| 3.170 | 1.142 | $-0.123$ | 0.362 | 0.662 |

TABLE 19-(b)

| $\delta$ | $\epsilon_{max}$ | $r_4/r_3$ | $f_p/r_3$ | $f_T/f_T$ | $f_p/f_v$ |
|---|---|---|---|---|---|
| $-0.755$ | 26.381 | 0.0 | 0.0 | 3.916 | 4.786 |

Figure 4:
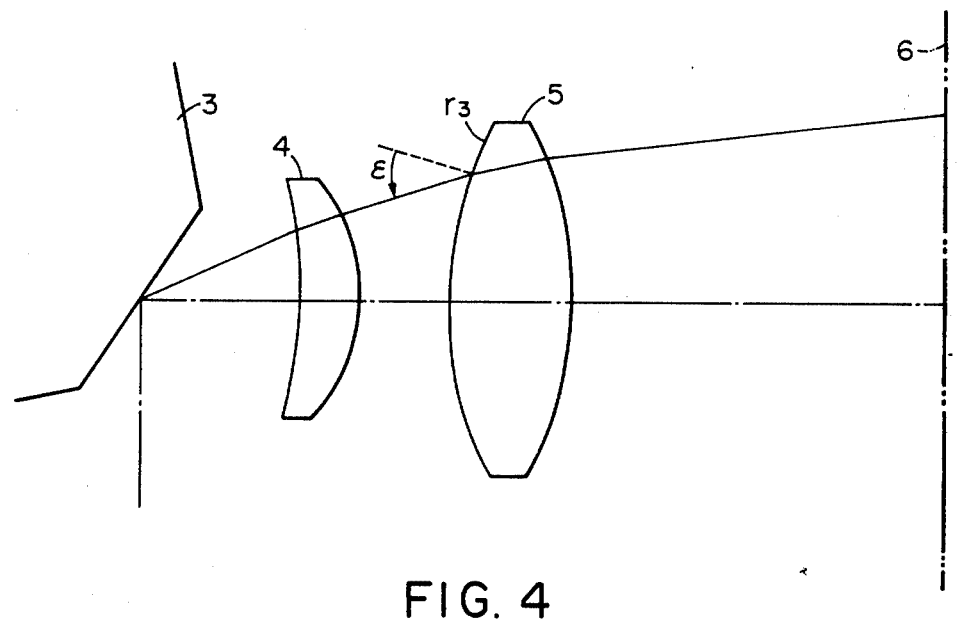
FIG. 4 illustrates the angle $\epsilon$ at which the principal ray deflected in the plane parallel to the deflecting surface is incident on a lens having a toric surface.
Figures 5, 6:
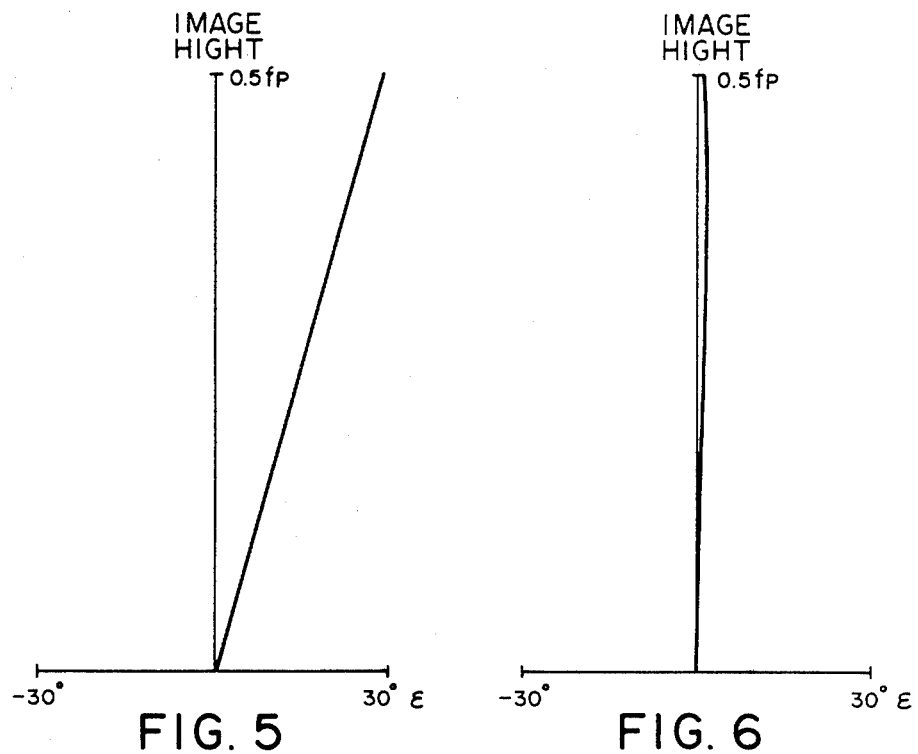
FIGS. 5, 6 and 7 show the relation between the image height and the angle $\epsilon$ in the scanning lens system used in the present invention.
Figure 7:
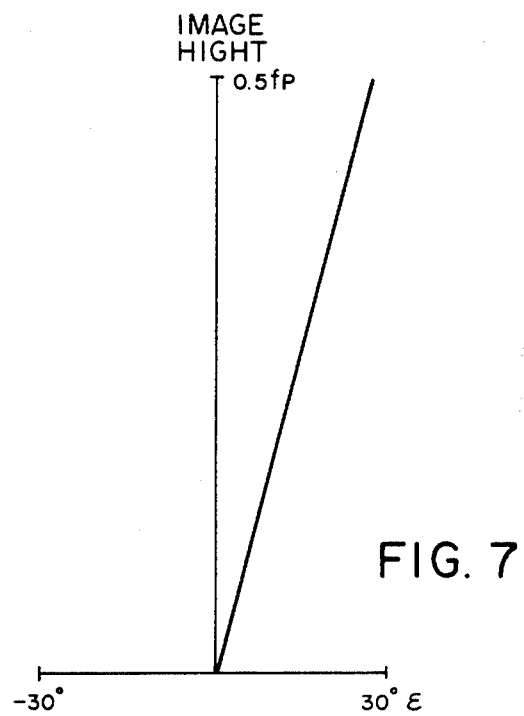

As shown in FIG. 4, in the plane parallel to the deflecting surface, the angle formed by the normal (indicated by broken line) to the $r_3$ surface at the point of intersection between the deflected principal ray and the $r_3$ surface of the single lens 5 having a toric surface with the principal ray is expressed as $\epsilon$ (unit: degree, and the counter-clockwise direction is adopted as the positive direction), and the $\epsilon$ corresponding to the maximum image height ($=0.5 \cdot f_p$) is expressed as $\epsilon_{max}$. FIG. 5 shows the relation between $\epsilon$ and the image height in the embodiment shown in Tables 1-(a)-(d). FIG. 6 shows the relation between $\epsilon$ and the image height in the embodiment shown in Tables 12-(a)-(d). FIG. 7 shows the relation between $\epsilon$ and the image height in the embodiment shown in Tables 13-(a)-(d).

As shown in FIGS. 5 and 7, in the embodiments shown in Tables 1 and 13, as the image height becomes greater, $\epsilon$ also increases. That is, as the incidence angle of view is increased, the $r_3'$ surface of the lens 5 having a toric surface comes to have a stronger power for the light beam in the cross-section containing the principal ray and perpendicular to the deflecting surface, as compared with the case of the on-axial ray. This, coupled with the effect of the $r_3$ surface of the lens 5 having a toric surface, is convenient to the correction of the curvature of image field for causing the light beam deflected in said cross-section to form a good imaging spot on the scanned medium 6, and the entire optical system subsequent to the deflecting surface has a strain characteristic which effects equal speed scanning on the scanned surface in the plane parallel to the deflecting surface and the effect of correcting the fall-down in the cross-section perpendicular to the deflecting surface. In the embodiment shown in Table 12, the value of $\epsilon$ is substantially in the vicinity of 0° as shown in FIG. 6. In this embodiment, when the effective F No.=60 in the plane parallel to the deflecting surface, the spherical aberration equals $-0.00037 \cdot f_p$ and, when the image height equals $0.5 \cdot f_p$, the astigmatism equals $-0.11 \cdot f_p$ and L.I.N.=1.4, where L.I.N. is an amount representing linearity, which in turn is represented by linearity=

$$\frac{y' - f_p \cdot \theta}{f_p \cdot \theta} \times 100$$

(y' is the image height). Also, in the cross-section perpendicular to the deflecting surface, when the effective F No.=100, the spherical aberration equals $-0.0061 \cdot f_p$ and when the image height equals $0.5 \cdot f_p$, the astigmatism equals $-0.003 \cdot f_p$. As shown in Table 12-(b), the difference between $S_{k'}$ in the plane parallel to the deflecting surface and $S_{k'}$ in the cross-section perpendicular to the deflecting surface is $0.0434 \cdot f_p$. Accordingly, in this embodiment, in the plane parallel to the deflecting surface and the cross-section perpendicular to the deflecting surface, the performance as the scanning optical system of the present invention is considerably aggravated but is near the diffraction limit. In this embodiment, $f_p/r_3 = -2.04$ as shown in Table 12-(d).

Figure 8A:
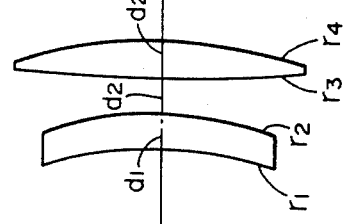
FIGS. 8A and 8B show the shape of an embodiment of the scanning lens applied in the present invention.
Figure 8B:
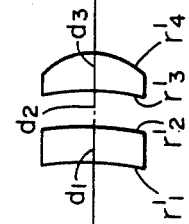
Figure 9A:
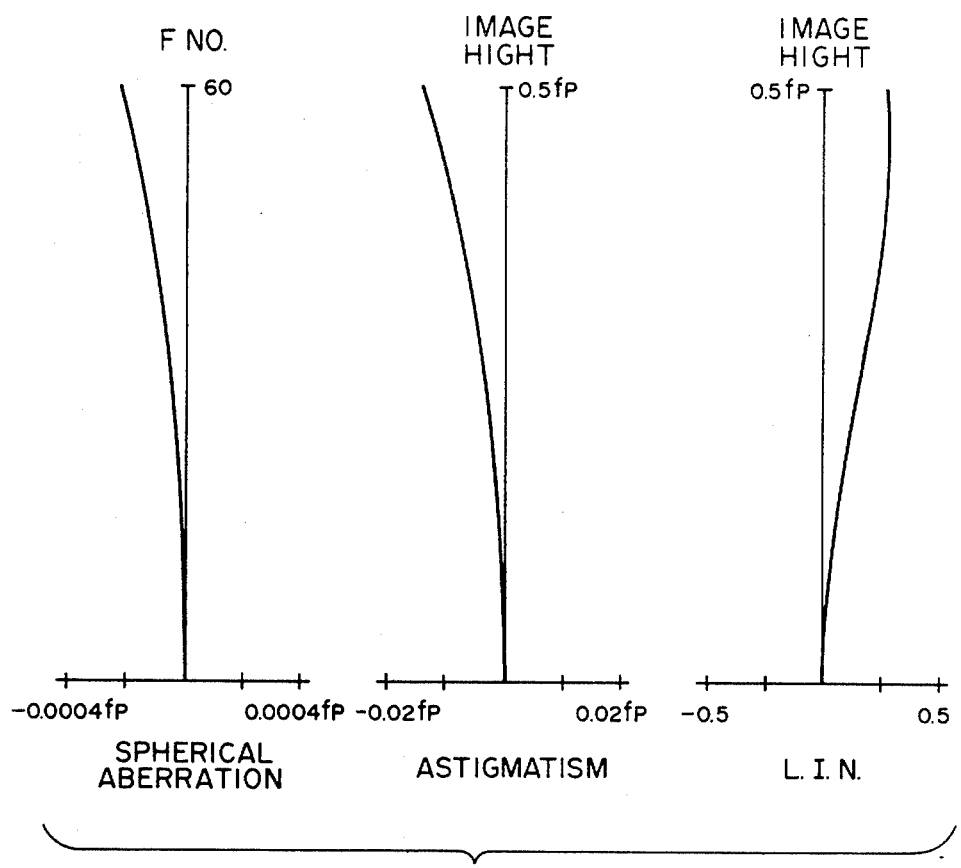
FIGS. 9A and 9B illustrate the various aberrations in the Gaussian image plane of the lens shown in FIGS. 8A and 8B.
Figure 9B:
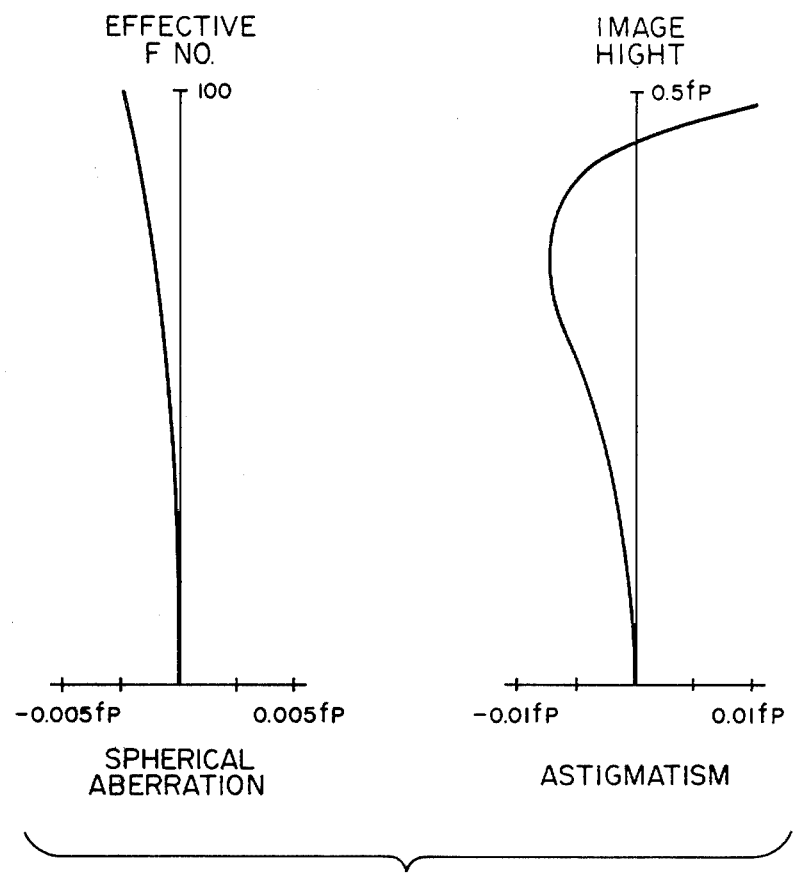

FIG. 8A shows the shape of the lens of the Table 1 embodiment in the plane parallel to the deflecting surface, and FIG. 8B shows the shape of the lens of the same embodiment in the cross-section perpendicular to the deflecting surface. FIG. 9A illustrates the aberrations in the same embodiment in the plane parallel to the deflecting surface, and FIG. 9B illustrates the aberrations in the same embodiment in the cross-section perpendicular to the deflecting surface.

Figure 10A:
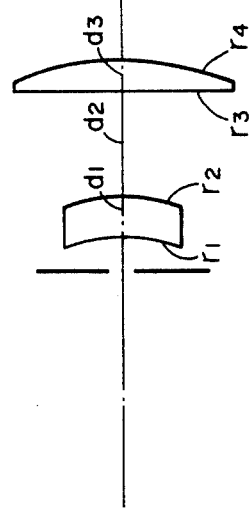
FIGS. 10A and 10B show the shape of another embodiment of the scanning lens applied in the present invention.
Figure 10B:
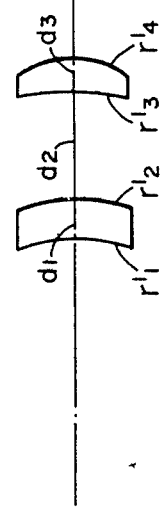
Figure 11A:
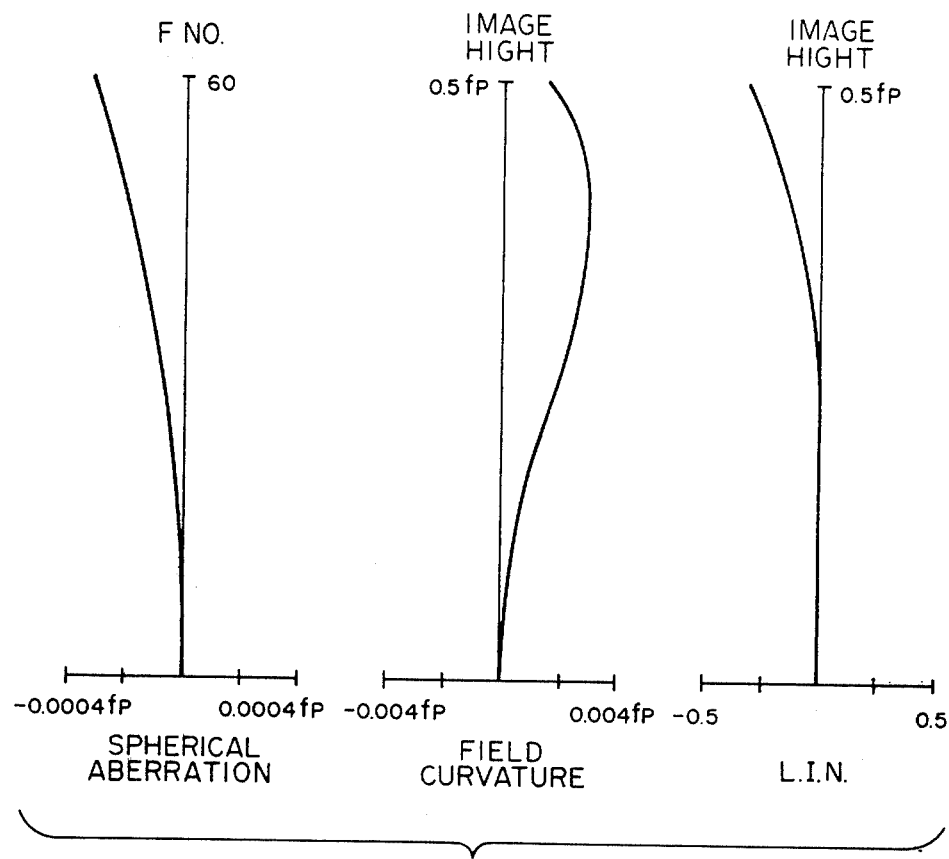
FIGS. 11A and 11B illustrate the various aberrations in the Gaussian image plane of the lens shown in FIGS. 10A and 10B.
Figure 11B:
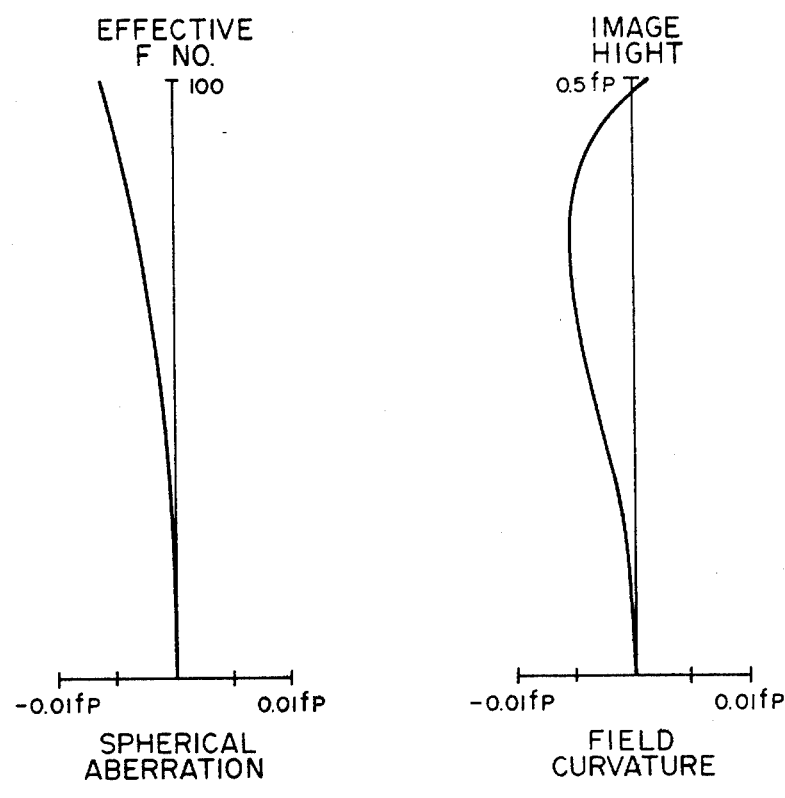

FIG. 10A shows the shape of the lens of the Table 13 embodiment in the plane parallel to the deflecting surface, and FIG. 10B shows the shape of the lens of the same embodiment in the cross-section perpendicular to the deflecting surface. FIG. 11A illustrates the aberrations in the same embodiment in the plane parallel to the deflecting surface, and FIG. 11B illustrates the aberrations in the same embodiment in the cross-section perpendicular to the deflecting surface.

In FIGS. 9A and 9B and FIGS. 11A and 11B, as shown in the columns $S_k$, of those of the Tables which are given the suffix (b), the distance from the last surface (the $r_4$ or $r_4'$ surface) of the single lens 5 having a toric surface to the Gaussian image plane differs in the respective planes.

In view of the embodiments of the present invention shown in Tables 1-19, if, in the plane parallel to the deflecting surface, the relation between the deflector side curvature radius $r_3$ of the single lens 5 having a toric surface and the scanned medium side curvature radius $r_4$ of said lens 5 is $$1/r_3 > 1/r_4,$$

and in said plane, the deflector side curvature radius $r_3$ of the single lens 5 is in the relation that $$f_p/r_3 > -2.1$$

to the total focal length $f_p$ of the scanning lens system in said plane, and the relation between the focal length $f_p$ of the composite system comprising the spherical single lens 4 and the single lens 5 having a toric surface in the plane parallel to the deflecting surface and the focal length $f_v$ of said composite system in the cross-section perpendicular to the deflecting surface is $$3.0 < f_p/f_v \leq 5.0,$$

and the relation between the focal length $f/_T$ of the single lens 5 having a toric surface in the plane parallel to the deflecting surface and the focal length $f_T$ of the single lens 5 in the cross-section perpendicular to the deflecting surface is $$f_T/f_T < 13.0,$$

then the scanning optical system of the present invention has, in the plane parallel to the deflecting surface, a strain characteristic which effects equal speed scanning on the scanned medium 6 and, in the cross-section perpendicular to the deflecting surface, the effect of correcting fall-down.

In the foregoing description, the sign of the curvature radius is positive when the curvature is convex toward the deflector and negative when the curvature is concave toward the deflector.

Description will now be made of the position of the beam spot on the scanned medium in the scanning optical system according to the present invention.

Figure 12:
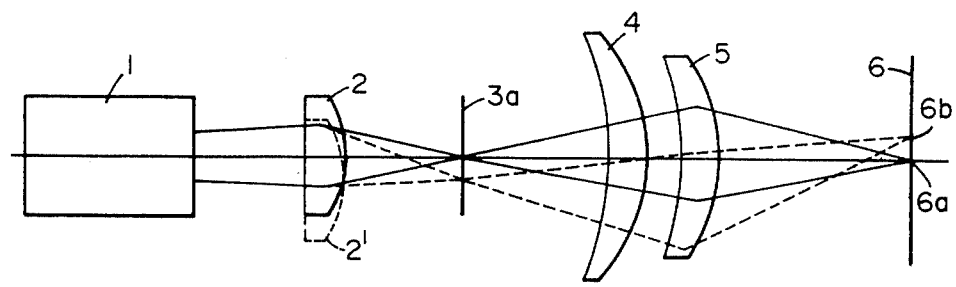
FIG. 12 illustrates the adjustment of the position of the scanning line in the scanning optical system according to the present invention.
Figures 13, 14:
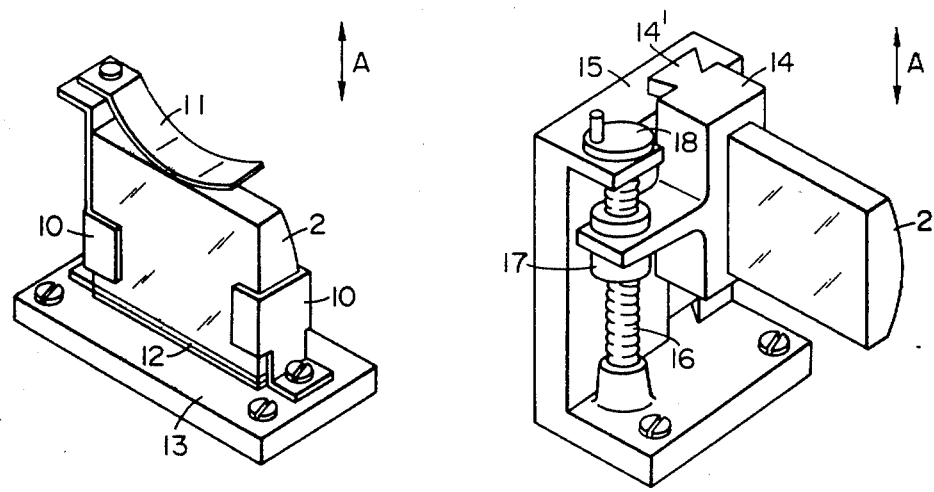
FIGS. 13 and 14 show a mechanism for adjusting the position of the scanning line in the scanning optical system of the present invention.

FIG. 12 is a developed view of the cross-section along the light beam in a direction perpendicular to the deflecting surface of FIG. 1. In FIG. 1, the light beam emitted from the light source device 1 is linearly imaged near the deflecting-reflecting surface 3a by the linear image forming system 2, and is further imaged at the position 6a on the scanned medium 6 by the composite system comprising the spherical single lens 4 and the lens 5 having a toric surface. Next, when the linear image forming system 2 is parallel-moved to a position 2' indicated by broken line, that is, when the linear image forming system 2 is moved in a direction orthogonal to the optical axis and orthogonal to the lengthwise direction of the linear image, the light beam passed through the linear image forming system 2 varies as indicated by broken lines and is imaged at the position 6b on the scanned medium 6. That is, by the linear image forming system 2 being moved in the direction orthogonal to the optical axis and orthogonal to the lengthwise direction of the linear image, the imaging position, namely, the scanning line position, on the scanned medium 6 can be simply adjusted. FIGS. 13 and 14 show embodiments of the device for adjusting the above-described scanning line position.

In FIG. 13, the direction indicated by arrow A is the direction orthogonal to the optical axis of the linear image forming system 2 and orthogonal to the lengthwise direction of the linear image. The linear image forming system 2 is made immovable in any other direction than the direction of arrow A by a frame 10 and further, the linear image forming system 2 is biased downwardly in the direction of arrow A by a spring 11.

Accordingly, by inserting or removing an adjust plate 12 of a suitable thickness between a base 13 and the underside of the linear image forming system 2, any desired amount of parallel movement in the direction of arrow A can be imparted to the linear image forming system 2 to enable the adjustment of the scanning line position to be simply accomplished. In the embodiment of FIG. 14, the linear image forming system 2 is fixed to a moving frame 14 which in turn is fitted to a base bed 15 at a groove 14'. Accordingly, as in the embodiment of FIG. 13, the linear image forming system 2 is restricted in movement in any other direction than the direction of arrow A. In the base bed 15, there is a feed screw 16 which is threadably coupled to a nut 17 fixed to the moving frame 14. Therefore, by rotating a threaded thumb 18, the linear image forming system can be moved as desired in the direction of arrow A to enable the adjustment of the scanning line position to be accomplished.

Figure 15:
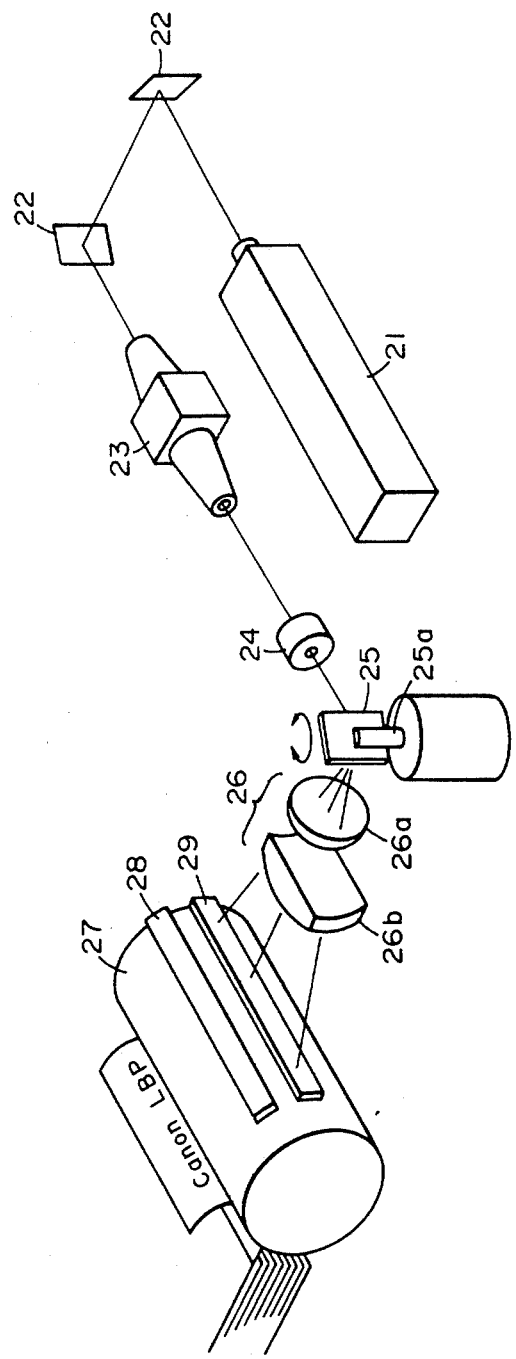
FIG. 15 is a schematic view showing an embodiment of the laser beam printer to which the present invention is applied.

FIG. 15 shows an embodiment in which the scanning optical system according to the present invention is applied to a laser beam printer. In FIG. 15, a laser beam oscillated by a laser oscillator 21 is directed via a mirror 22 to the entrance opening of a modulator 23. After subjected to the modulation of an information signal to be recorded by the modulator 23, the laser beam forms a linear image orthogonal to the rotational axis of a deflector 25, near the deflecting-reflecting surface of the deflector, by a linear image forming system 24 comprising, for example, a cylindrical lens. The beam deflected by the deflector 25 is imaged on a photosensitive drum 27 by an imaging lens system 26 comprising the spherical single lens 26a and the toric single lens 26b and scans over the photosensitive drum 27 at an equal speed. Designated by 28 is a first corona charger, and denoted by 29 is an AC corona discharger. These form a part of the electrophotographic process.

The laser oscillator 21 may be a light source device comprising a self-modulatable semiconductor laser and a beam shaping optical system which corrects the cross-sectional shape of the laser beam from the semiconductor laser and which makes the laser beam into an afocal light.

In the above-described application, the light beam incident on the spherical single lens 26a in the plane parallel to the deflecting surface need not always be a parallel light but may be a divergent light or a convergent light, and the purpose of causing the light beam to be imaged near the reflecting surface of the deflector 25 in the cross-section perpendicular to the deflecting surface can be readily accomplished by the light source device 21 comprising a light source and a condenser device and the linear image formation apparatus 24.

Also, in the above-described application, where a light source like a semiconductor laser in which the angle of light emission differs in two orthogonal planes is used as the light source device 21, even if a rotatable symmetrical optical system is used as the linear image forming system 24 by utilizing the fact that the light emitting source points in said two orthogonal planes differ (because this is equivalent to the fact that the object point has an astigmatic difference in said two orthogonal planes), it is also possible to cause the light beam to be imaged near the reflecting surface of the deflector 25 in the cross-section perpendicular to the deflecting surface and to cause a divergent light or a convergent light to be incident on the spherical single lens 26a in the plane parallel to the deflecting surface.

What we claim is:

1. A scanning optical system having a fall-down correcting function, comprising:
    a light source portion;
    a first imaging optical system for linearly imaging the light beam from said light source portion;
    a deflector having its deflecting-reflecting surface near the linear image formed by said first imaging optical system; and
    a second imaging optical system disposed between said deflector and a medium to be scanned, having means for making constant the moving velocity of a light beam spot on said medium, and comprising, in succession from the deflector side, a spherical single lens and a single lens having a toric surface, said toric surface having its curvature radius, in the deflecting surface formed by the light beam deflected by said deflector, greater than its curvature radius in the plane orthogonal to the deflecting surface, said single lens having a toric surface having a positive refractive power and comprising a surface having a negative refractive power on the deflector side and a surface having a positive refractive power on the medium side, in a cross-section containing the optical axis of said spherical single lens and perpendicular to the deflecting surface, said single lens having a toric surface further satisfying $(1/r_3) > (1/r_4)$, where $r_3$ is the curvature radius of the deflector side surface thereof in said deflecting surface and $r_4$ is the curvature radius of the scanned medium side surface thereof in said deflecting surface.

2. A scanning optical system according to claim 1, wherein in said deflecting surface, the curvature radius $r_3$ of the deflector side surface of said single lens having a toric surface satisfies $(f_p/r_3) > -2.1$ with respect to the focal length $f_p$ of said second imaging optical system in said deflecting surface.

3. A scanning optical system according to claim 1, wherein the focal length $f_T$ of said lens having a toric surface in said deflecting surface satisfies $(f_T/f'_T) < 13.0$ with respect to the focal length $f'_T$ of said lens having a toric surface in a plane perpendicular to said deflecting surface and containing the optical axis of said spherical single lens.

4. A scanning optical system according to claim 1, wherein the focal length $f_p$ of said second imaging optical system in a plane parallel to the deflecting surface and the focal length $f_v$ in a plane perpendicular to the deflecting surface satisfies $3.0 < (f_p/f_v) \leq 5.0$.

5. A scanning optical system according to claim 1, wherein said spherical single lens is a meniscus lens having a concave surface facing toward the deflector.

6. A scanning optical system according to claim 1, wherein said light source portion includes a laser beam generator, and said first imaging optical system is an anamorphic optical system, the medium to be scanned including a photosensitive medium.

7. A scanning optical system having a fall-down correcting function, comprising:
    a light source portion;
    a deflector for deflecting the light beam from said light source portion in a predetermined direction;
    a scanned medium scanned by the light beam deflected by said deflector;
    a first imaging optical system disposed between said light source portion and said deflector for linearly imaging the light beam from said light source portion near the deflecting-reflecting surface of said deflector, said first imaging optical system having means for moving the position of the light beam spot on said scanned medium in a direction orthogonal to the scanning direction of the light beam on said scanned medium; and
    a second imaging optical system disposed between said deflector and said scanned medium and comprising, in succession from the deflector side, a spherical single lens and a single lens having a toric surface.

* * * * *

UNITED STATES PATENT AND TRADEMARK OFFICE
CERTIFICATE OF CORRECTION

PATENT NO. : 4,379,612

DATED     : April 12, 1983

INVENTOR(S) : KAZUHIKO MATSUOKA, ET AL.

Page 1 of 10

It is certified that error appears in the above-identified patent and that said Letters Patent is hereby corrected as shown below:

Cover Page, Column 1

Insert after "Sep. 4, 1979 [JP] Japan......54-113094" the following:

-- July 25, 1980    Japan   55-102589
   August 6, 1980   Japan   55-108746--.

Column 5

Line 11, change "oi" and oi" to -- Aoi and Boi--.

Line 46, change "oi" to -- Boi--.

Line 66, change "$R_1$, and $R_2$," to --$R_1$, and $R_2$,--.

Column 6

Line 61, change "$f_T/r3$" to --$f_p/r3$--; change "$f_T/f_T$" to --$f_T/f_{T'}$--; and change "$f_p$" to --$f_T$--.

Line 64, change "$f_T$" to --$f_{T'}$--.

Line 67, change "$f_T/P_T$" to --$f_T/f_{T'}$--.

UNITED STATES PATENT AND TRADEMARK OFFICE
CERTIFICATE OF CORRECTION

PATENT NO. : 4,379,612
DATED : April 12, 1983
INVENTOR(S) : KAZUHIKO MATSUOKA, ET AL.

It is certified that error appears in the above-identified patent and that said Letters Patent is hereby corrected as shown below:

Column 9
(Table 1-(b)-continued)

In line labeled "Perpendicular cross-section", change "$f_T$" to --$f_{T'}$--.

Column 9

Line 15, change "$f_T/f_T$" to --$f_T/f_{T'}$--.

Column 9
(Table 2-(b))

In line labeled "Perpendicular cross-section", change "$f_T$" to --$f_{T'}$--.

Column 9
(Table 2-(d))

Change "$f_T/f_T$" to --$f_T/f_{T'}$--.

Column 9
(Table 3-(b))

In line labeled "Perpendicular cross-section", change "$f_T$" to --$f_{T'}$--.

Column 10
(Table 3-(d))

Change "$f_T/f_T$" to --$f_T/f_{T'}$--.

UNITED STATES PATENT AND TRADEMARK OFFICE
CERTIFICATE OF CORRECTION

PATENT NO. : 4,379,612

DATED : April 12, 1983

INVENTOR(S) : KAZUHIKO MATSUOKA, ET AL.

Page 3 of 10

It is certified that error appears in the above-identified patent and that said Letters Patent is hereby corrected as shown below:

Column 10
(Table 4-(b))

In line labeled "Perpendicular cross-section", change "$f_T$" to --$f_{T'}$--.

Column 10
(Table 4-(d))

Change "$f_T/f_T$" to --$f_T/f_{T'}$--.

Column 11
(Table 5-(b))

In line labeled "Perpendicular cross-section", change "$f_T$" to --$f_{T'}$--.

Column 11
(Table -5(d))

Change "$f_T/f_T$" to --$f_T/f_{T'}$--.

Column 11
(Table 6-(b))

In line labeled "Perpendicular cross-section", change "$f_T$" to --$f_{T'}$--.

UNITED STATES PATENT AND TRADEMARK OFFICE
CERTIFICATE OF CORRECTION

PATENT NO. : 4,379,612
DATED : April 12, 1983
INVENTOR(S) : KAZUHIKO MATSUOKA, ET AL.

It is certified that error appears in the above-identified patent and that said Letters Patent is hereby corrected as shown below:

Column 11
(Table 6-(d))

Change "$f_t/f'_t$" to --$f_T/f_{T'}$--.

Column 11
(Table 7-(b))

In line labeled "Perpendicular cross-section", change "$f_T$" to --$f_{T'}$--.

Column 12
(Table 7-(d))

Change "$f_T/f_T$" to --$f_T/f_{T'}$--.

Column 12
(Table 8-(b))

In line labeled "Perpendicular cross-section", change "$f_T$" to --$f_{T'}$--.

Column 12
(Table 8-(d))

Change "$f_T/f_T$" to --$f_T/f_{T'}$--.

UNITED STATES PATENT AND TRADEMARK OFFICE
CERTIFICATE OF CORRECTION

PATENT NO. : 4,379,612

DATED : April 12, 1983

INVENTOR(S) : KAZUHIKO MATSUOKA, ET AL.

It is certified that error appears in the above-identified patent and that said Letters Patent is hereby corrected as shown below:

Column 13
(Table 9-(b))

In line labeled "Perpendicular cross-section", change "$f_T$" to --$f_{T'}$--.

Column 13
(Table 9-(d))

Change "$f_T/F_T$" to --$f_T/f_{T'}$--.

Column 13
(Table 10-(b))

In line labeled "Perpendicular cross-section", change "$f_T$" to --$f_{T'}$--.

Column 13
(Table 10-(d))

Change "$f_T/f_T$" to --$f_T/f_{T'}$--.

UNITED STATES PATENT AND TRADEMARK OFFICE
CERTIFICATE OF CORRECTION

PATENT NO. : 4,379,612
DATED : April 12, 1983
INVENTOR(S) : KAZUHIKO MATSUOKA, ET AL.

It is certified that error appears in the above-identified patent and that said Letters Patent is hereby corrected as shown below:

Column 13
(Table 11-(b))

In line labeled "Perpendicular cross-section", change "$f_T$" to --$f_{T'}$--.

Column 14
(Table 11-(d))

Change "$f_T/f_T$" to --$f_T/f_{T'}$--.

Column 14
(Table 12-(b))

In line labeled "Perpendicular cross-section", change "$f_T$" to --$f_{T'}$--.

Column 14
(Table 12-(d))

Change "$f_T/f_T$" to --$f_T/f_{T'}$--.

Column 15
(Table 13-(b))

In line labeled "Perpendicular cross-section", change "$f_T$" to --$f_{T'}$--.

UNITED STATES PATENT AND TRADEMARK OFFICE
CERTIFICATE OF CORRECTION

PATENT NO. : 4,379,612

DATED : April 12, 1983    Page 7 of 10

INVENTOR(S) : KAZUHIKO MATSUOKA, ET AL.

It is certified that error appears in the above-identified patent and that said Letters Patent is hereby corrected as shown below:

Column 15
(Table 13-(d))

Change "$f_T/f_T$" to --$f_T/f_{T'}$--.

Column 15
(Table 14-(b))

In line labeled "Perpendicular cross section", change "$f_T$" to --$f_{T'}$--.

Column 15
(Table 14-(d))

Change "$f_T/f_T$" to --$f_T/f_{T'}$--.

Column 16
(Table 15-(b))

In line labeled "Perpendicular cross-section", change "$f_T$" to --$f_{T'}$--.

Column 16
(Table 15-(b))

Change "$S'_1$" to --$S_1'$--.

UNITED STATES PATENT AND TRADEMARK OFFICE
CERTIFICATE OF CORRECTION

PATENT NO. : 4,379,612

DATED : April 12, 1983

INVENTOR(S) : KAZUHIKO MATSUOKA, ET AL.

It is certified that error appears in the above-identified patent and that said Letters Patent is hereby corrected as shown below:

Column 16
(Table 15-(d))

Change "$f_T/f_T$" to --$f_T/f_{T'}$--.

Column 16
(Table 16-(b))

In line labeled "Perpendicular cross-section", change "$f_T$" to --$f_{T'}$--.

Column 16
(Table 16-(d))

Change "$f_T/f_T$" to --$f_T/f_{T'}$--.

Column 17
(Table 17-(b))

In line labeled "Perpendicular cross section", change "$F_T$" to --$f_{T'}$--.

Column 17
(Table 17-(d))

Change "$f_T/f_T$" to --$f_T/f_{T'}$--.

UNITED STATES PATENT AND TRADEMARK OFFICE
CERTIFICATE OF CORRECTION

PATENT NO. : 4,379,612

DATED : April 12, 1983

INVENTOR(S) : KAZUHIKO MATSUOKA, ET AL.

It is certified that error appears in the above-identified patent and that said Letters Patent is hereby corrected as shown below:

Column 17
(Table 18-(b))

In line labeled "Perpendicular cross-section", change "$f_T$" to --$f_{T'}$--.

Column 17
(Table 18-(d))

Change "$f_T/f_T$" to --$f_T/f_{T'}$--.

Column 18
(Table 19-(b))

In line labeled "Perpendicular cross-section", change "$f_T$" to --$f_{T'}$--.

Column 18

Line 22, change "19-(b)" to --19-(d)--, and

Line 23, change "$f_T/f_T$" to --$f_T/f_{T'}$--.

Column 19

Line 38, change "$S_k$" to --$S_{k'}$--.
    Line 68, change "$f_T$" to --$f_{T'}$--.

UNITED STATES PATENT AND TRADEMARK OFFICE
CERTIFICATE OF CORRECTION

PATENT NO. : 4,379,612

DATED : April 12, 1983

INVENTOR(S) : KAZUHIKO MATSUOKA, ET AL.

It is certified that error appears in the above-identified patent and that said Letters Patent is hereby corrected as shown below:

Column 20

Line 4, change "$f_T/f_T$" to -- $f_T/f_{T'}$ --.

Column 22, line 21
Claim 2, line 4

Change "(fp/$r_3$) to --($f_p/r_3$)--.

Signed and Sealed this

Fifth Day of June 1984

[SEAL]

Attest:

Attesting Officer

GERALD J. MOSSINGHOFF

Commissioner of Patents and Trademarks